March 31, 1953   A. J. ROEDER   2,633,221
AUXILIARY FEED AND GUIDE MEANS FOR POWER MACHINES
Filed May 3, 1949   2 SHEETS—SHEET 1
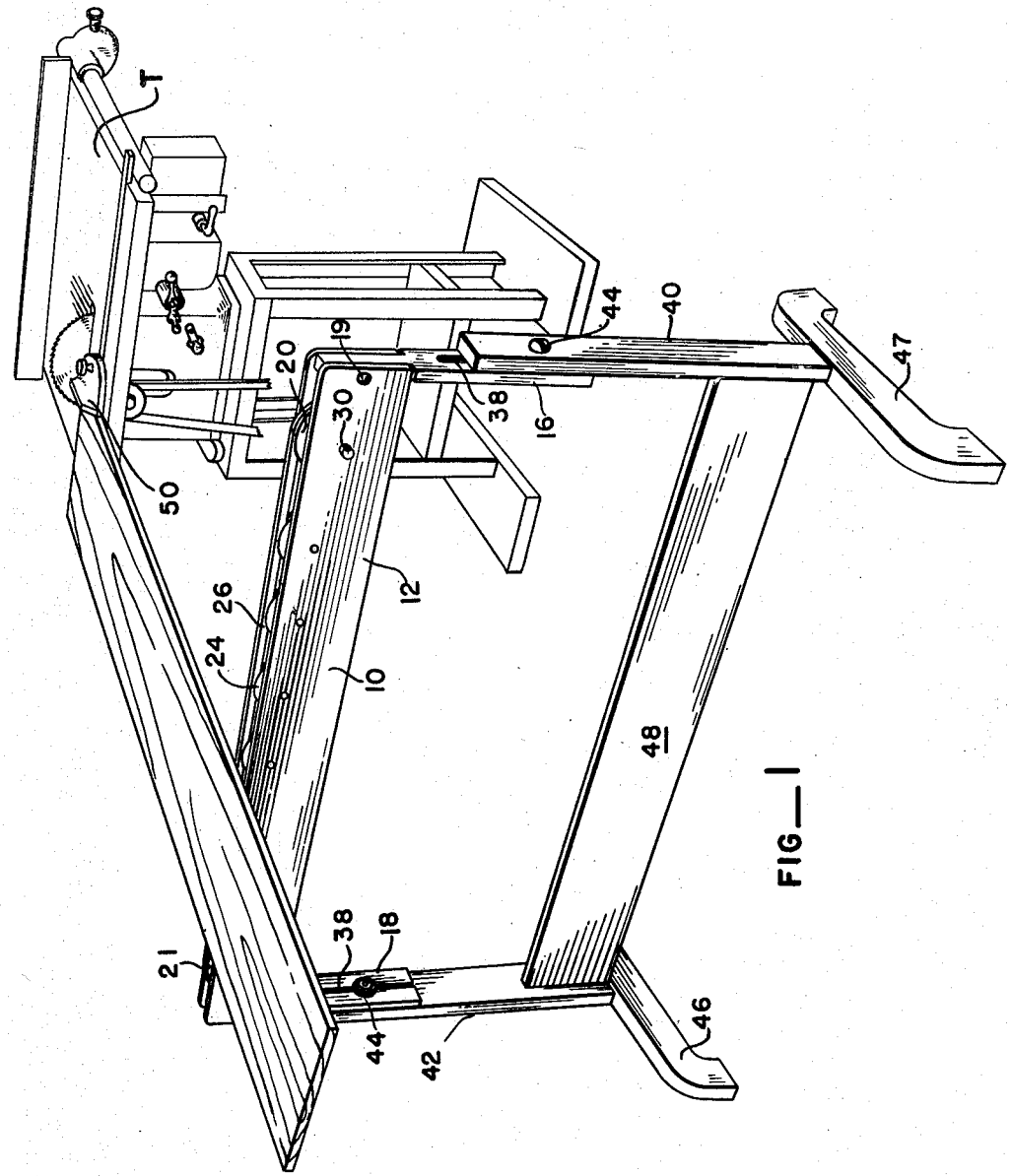
FIG—1
ANDREW J. ROEDER
Inventor
By Smith & Tuck
Attorneys

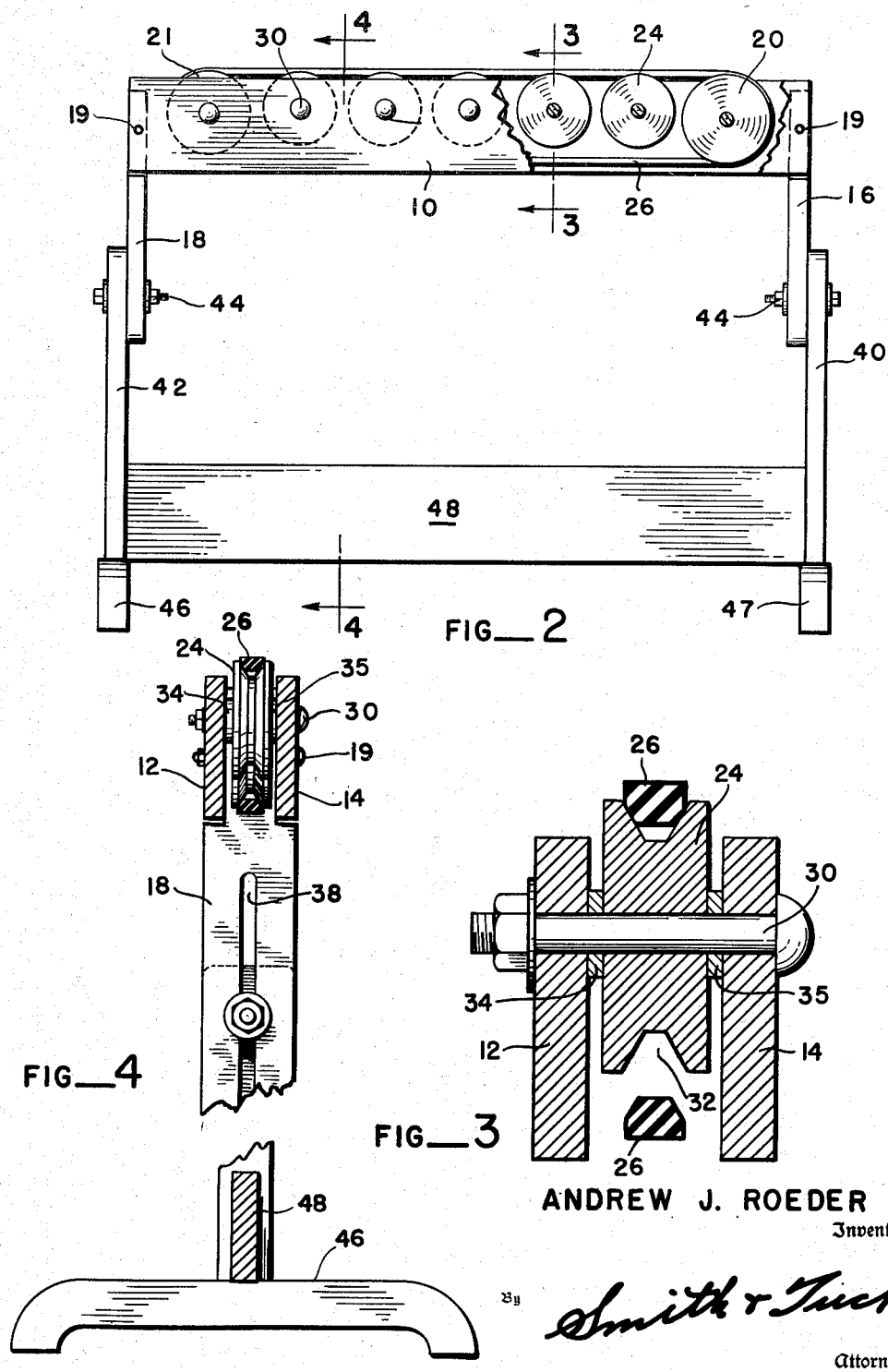

Patented Mar. 31, 1953

2,633,221

UNITED STATES PATENT OFFICE 2,633,221

AUXILIARY FEED AND GUIDE MEANS FOR POWER MACHINES

Andrew J. Roeder, Everett, Wash.

Application May 3, 1949, Serial No. 91,044

3 Claims. (Cl. 193—35)

My present invention relates to the general art of accessories for machine tool equipment and, more particularly, to an auxiliary feed and guide means for power machines.

In many lines of industry, it is necessary to operate on the edge of large sheet stock or on the ends of boards and the like. Economical construction of the main machine tool requires that the working table surface be kept to a reasonable maximum in size, and when large sheets of plywood or structural shapes or sheets that may be many feet long are to be worked, some auxiliary supporting means must be employed, or the material has to be held by hand by a second or third operator. This is most unsatisfactory, as too often the efforts of the helpers interfere with the guiding necessarily done by the mechanic operating the machine.

It is to provide a means which will enable the mechanic to use machine tools on large sheets, and the like, that I have produced my auxiliary guide and feeding means.

The principal object of my present invention, therefore, is to provide an auxiliary feed means which will permit an operator working at one end of a large piece of sheet stock to feed the same across a table, as for instance a table saw, and to have full control of the sheet so that it may be guided accurately for the operation in hand.

A further object of my present invention is to provide a rest for long lengths of material, which will have the minimum of friction, to the end that the material can be easily handled by a single operator at one end of that sheet.

A further object of my present invention is to provide a travelling rubber belt so arranged that it alone supports the overhanging portion of sheet stock that is being worked on a power machine, and which will permit it being guided across the power tool at one end.

A further object of my invention is to provide an auxiliary rest and feed means which is readily adjustable in height, so that it may be used to support long material that is being processed on a tilting table top.

A further object of my present invention is to provide an auxiliary supported guide means of narrow width, so that it can adequately support materials which may be moved across it even though they are tipped considerably from the horizontal plane.

Further objects, advantages and capabilities will be apparent from the description and disclosure in the drawings, or may be comprehended or are inherent in the device.

In the drawings:

Fig. 1 is a perspective view showing my auxiliary support and feed means as used in the processing of a long, wide board on a table saw.

Fig. 2 is a vertical, or side elevational view of my device with certain parts broken away to better illustrate the interior construction.

Fig. 3 is a cross-sectional view taken along the line 3—3 of Fig. 2.

Fig. 4 is a vertical cross-sectional view taken along the line 4—4 of Fig. 2.

Referring more particularly to the disclosure in the drawings, the numeral 10 designates generally the top frame or supporting member of my device. This framework consists essentially of the two side members 12 and 14 which are pivotably secured at each end by spacing upright members 16 and 18, and bolts 19. End members 16 and 18 provide a groove or slot between members 12 and 14 in which are disposed a plurality of belt-supporting sheaves.

At each end of the slot provided in frame 10, I have disposed, for free revolution, the enlarged sheaves 20 and 21. Intermediate sheaves 20, 21, is a plurality of supporting sheaves 24. These sheaves are of sufficiently less diameter than sheaves 20 and 21 so that they will not engage the lower or return portion of belt 26, but merely serve to support the upper stretch of the belt.

The manner of supporting the various sheaves is probably best illustrated in Figs. 3 and 4, in which a through bolt 30 is employed, passing through both members 12 and 14 and serving as a bearing for the sheave as 24. In order to provide alignment of the groove portion 32 of the sheaves, I have provided on each side of the sheave separate washers, as 34, 35.

Attention is invited to the upper portions of Figs. 3 and 4 which, it is believed, clearly show belt 26 as being well above either the sheave or the supporting side bars 12 and 14, which is an essential relationship in that it permits the supporting of boards that rest on the belt at quite an angle to the horizontal. This feature makes it possible to use my equipment with a band-saw or table saw or other machine tool equipment in which the work table itself is capable of tilting adjustment.

In order to adapt my device to different types of machines and, more especially, to adapt it to a machine where the table top may be tilted, I have provided that members 16 and 18 will be slotted as at 38, and be clamped to upright members 40 and 42, as by means of bolts 44. The upright members 40, 42 are provided with transversely extending foot members 46 and 47, and a longitudinally extending tie member 48. This combines my various elements in a single structure, which is rigid with itself, is capable of a wide range of adjustment, and can be easily and conveniently moved from place to place.

*Method of operation*

It is believed that the operation of my device will be substantially apparent from a study of Fig. 1. However, it is desired to point out that the top of belt 26 should be on the same plane as the top of table T, so that any materials that my feed device is required to support, will lie in full and complete engagement with the table top. The operator, once he has adjusted his guide member 50, places the material against it and then, holding the board near the saw end, he merely shoves it across the saw table. During this operation, belt 26, which is closely supported across the length of frame 10, merely acts as a movable supporting surface, and, operating as it does with a minimum of friction, it gives the operator full control of even a long length of plywood, even through he is handling it from the end adjacent the saw or other machine tool that is being used to process the end of the sheet.

It has been found in use that my auxiliary supporting device will enable an operator to do quicker and more accurate work than if he were to have one or more helpers assisting him. This is due to the fact that the entire operation is fully and directly under his individual control. It will be further apparent, it is believed, that for very long material, two or more of my supporting devices might be used on a single board or sheet, and no doubt many other uses will be apparent to those skilled in this line of work.

It is believed that it will be clearly apparent from the above description and the disclosure in the drawings that the invention comprehends a novel consrtuction of an auxiliary feed and guide means for power machines.

Having thus disclosed the invention, I claim:

1. An anti-frictional support adapted to be positioned in a position spaced from and parallel to the blade of a rotary saw to support lumber for cross-cutting, consisting of: a top frame having two parallel side members having upright spacing members adapted to space them apart one from another; belt-tensioning idler sheaves disposed one at each end of said top frame; a series of belt-supporting idler sheaves, of less diameter than, and disposed intermediate said tensioning sheaves; all of said sheaves having journals disposed to position the peripheries of said sheaves tangent to a plane parallel to and above the top edges of said side members; a V-shaped, endless, flexible belt encircling said sheaves to move freely thereon and following a path of travel having a horizontal run above said sheaves and above the upper sides of said side members a substantial distance, said belt-supporting sheaves being positioned to support said belt in said horizontal run; a supporting base frame for said top frame having transversely extending foot members, upright support members secured at the centers of said foot members and a tie member connecting said upright supports and adjustable securing means disposed between said base uprights and said top frame uprights adapted to position each end of said top frame at the heights desired, said belt being narrow and being formed of rubber-like material.

2. An anti-frictional support adapted to be positioned in a position spaced from and parallel to the blade of a rotary saw to support lumber for cross-cutting, having a top frame having two parallel side members positioned in spaced apart relation one to another, an upright member pivotally connected to each end of said top frame to pivot about a horizontal axis running transversely of said top frame, belt-tensioning idler sheaves disposed one at each end of said top frame and rotatably mounted between said side members, a series of belt-supporting idler sheaves, of less diameter than, and disposed intermediate of, said tensioning sheaves and rotatably mounted between said side members, all of said sheaves being disposed with the peripheries of said sheaves tangent to a plane parallel to and substantially above the top edges of said side members, a narrow endless belt encircling said sheaves to move freely thereon and following a path of travel having a run above said sheaves and above the upper edges of said side members a substantial distance, said belt-supporting sheaves being positioned to support said belt in said run, a supporting base frame for said upright members and adjustable securing means between the lower portions of said upright members and said base frame for securing said upright spacing members at various heights.

3. An anti-frictional support adapted to be positioned in a position spaced from and parallel to the blade of a rotary saw to support lumber for cross-cutting, having a top frame formed by two parallel side members and by two upright spacing members spacing said side members apart and pivotally connected to the ends thereof to pivot about horizontal axes running transversely of said top frame, belt-tensioning idler sheaves disposed one at each end of said top frame and rotatably mounted between said side members, a series of belt-supporting idler sheaves, of less diameter than, and disposed intermediate of, said tensioning sheaves and rotatably mounted between said side members, all of said sheaves being disposed with the peripheries of said sheaves tangent to a plane parallel to and substantially above the top edges of said side members, a narrow endless belt encircling said sheaves to move freely thereon and following a path of travel having a run above said sheaves and above the upper edges of said side members a substantial distance, said belt-supporting sheaves being positioned to support said belt in said run, a supporting base frame for said upright spacing members and adjustable securing means between the lower portions of said upright spacing members and said base frame for securing said upright spacing members at various heights.

ANDREW J. ROEDER.

REFERENCES CITED

The following references are of record in the file of this patent:

UNITED STATES PATENTS

| Number | Name | Date |
|---|---|---|
| 1,044,816 | Phillipson | Nov. 19, 1912 |
| 1,431,488 | Reed | Oct. 10, 1922 |
| 1,543,219 | Mason | June 23, 1925 |
| 1,652,774 | Fraser et al. | Dec. 13, 1927 |
| 2,237,615 | Roberts | Apr. 8, 1941 |
| 2,353,239 | Horstkotte | July 11, 1944 |
| 2,517,112 | Jones | Aug. 1, 1950 |